United States Patent
Reisenhofer

(10) Patent No.: US 9,481,409 B2
(45) Date of Patent: Nov. 1, 2016

(54) UNDERBODY PANELLING

(71) Applicant: MAGNA STEYR Fahrzeugtechnik AG & Co KG, Graz (AT)

(72) Inventor: Eric Reisenhofer, Graz (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 0 days.

(21) Appl. No.: 14/323,055

(22) Filed: Jul. 3, 2014

(65) Prior Publication Data
US 2015/0008698 A1 Jan. 8, 2015

(30) Foreign Application Priority Data
Jul. 5, 2013 (EP) ..................................... 13175284

(51) Int. Cl.
*B62D 35/02* (2006.01)
*B62D 25/20* (2006.01)

(52) U.S. Cl.
CPC ............... *B62D 35/02* (2013.01); *B62D 25/20* (2013.01); *B62D 25/2072* (2013.01)

(58) Field of Classification Search
CPC ...... B62D 35/00; B62D 35/02; B62D 25/20; B62D 25/2072
USPC ........................................... 296/181.5, 180.1
See application file for complete search history.

(56) References Cited

U.S. PATENT DOCUMENTS 6,345,791 B1 * 2/2002 McClure .................. B63B 1/34
244/130
2013/0026783 A1 * 1/2013 Kakiuchi et al. .......... 296/180.1

FOREIGN PATENT DOCUMENTS

| DE | 930724 C | 7/1955 |
|----|----------|--------|
| DE | 4319281 A1 | 12/1994 |
| DE | 102006046814 A1 | 4/2008 |
| EP | 2557023 A1 | 2/2013 |
| EP | 2572918 A1 | 3/2013 |

* cited by examiner

*Primary Examiner* — Glenn Dayoan
*Assistant Examiner* — Melissa A Black
(74) *Attorney, Agent, or Firm* — Jordan IP Law, LLC; Todd A. Vaughn

(57) ABSTRACT

A motor vehicle component having at least one surface which, in the installed position, forms an outer side of the motor vehicle, in which the surface has substantially V-shaped and/or substantially U-shaped projections, with the closed sides thereof facing a direction of air flow during normal operation of the motor vehicle.

16 Claims, 8 Drawing Sheets

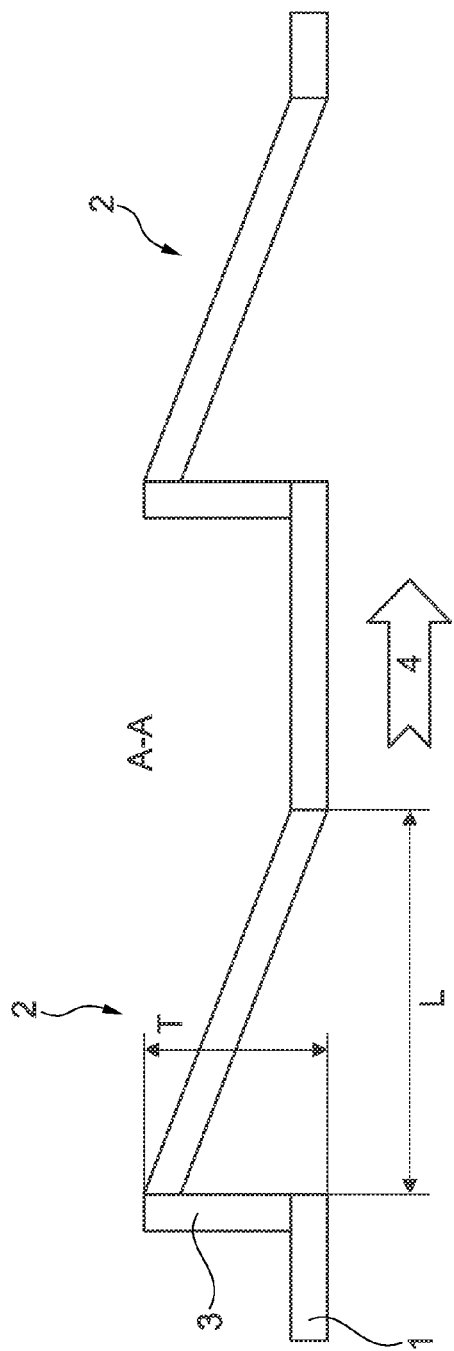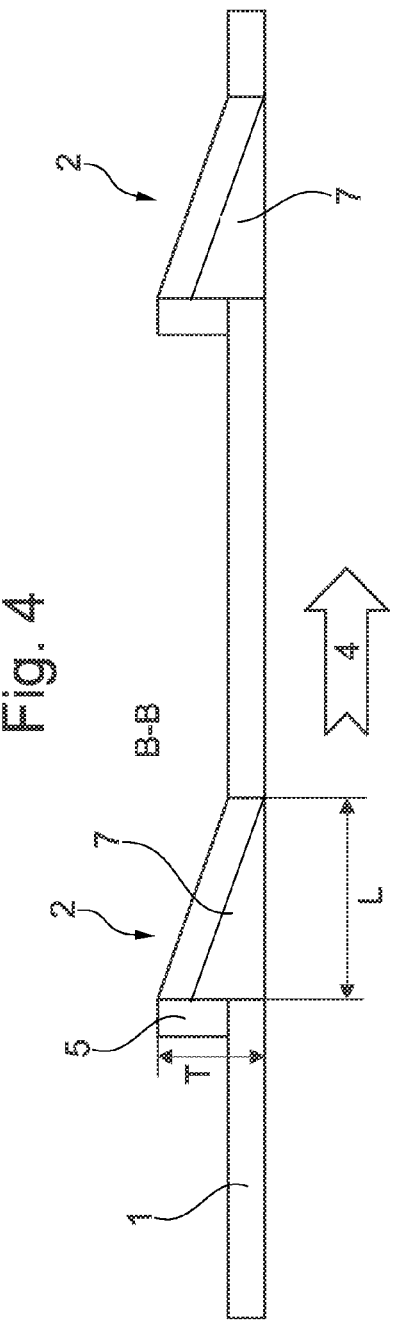

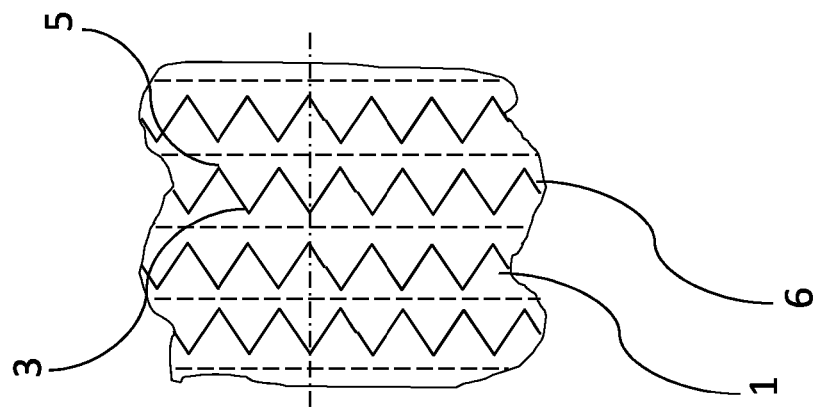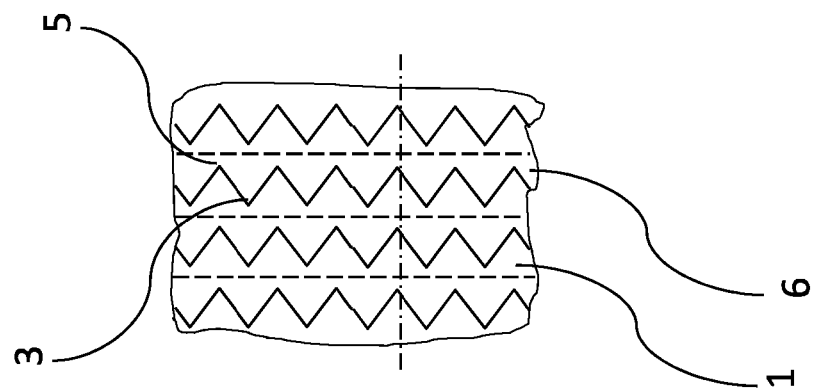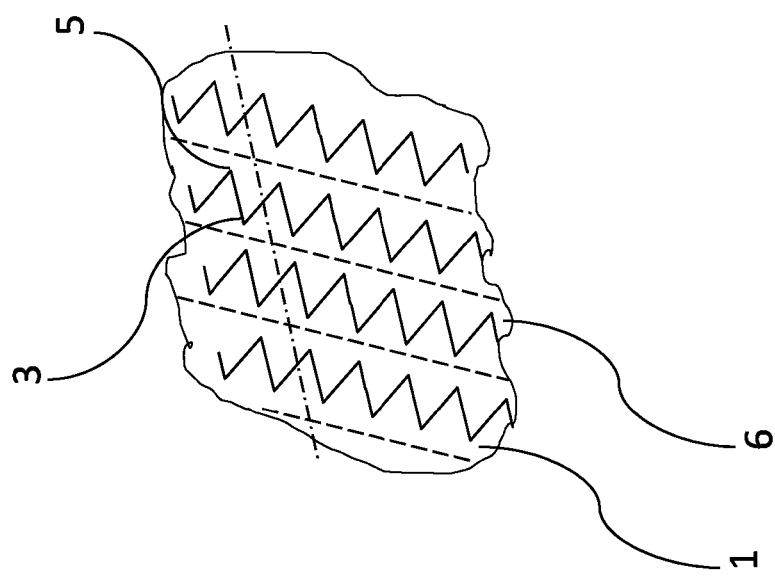
Fig. 9

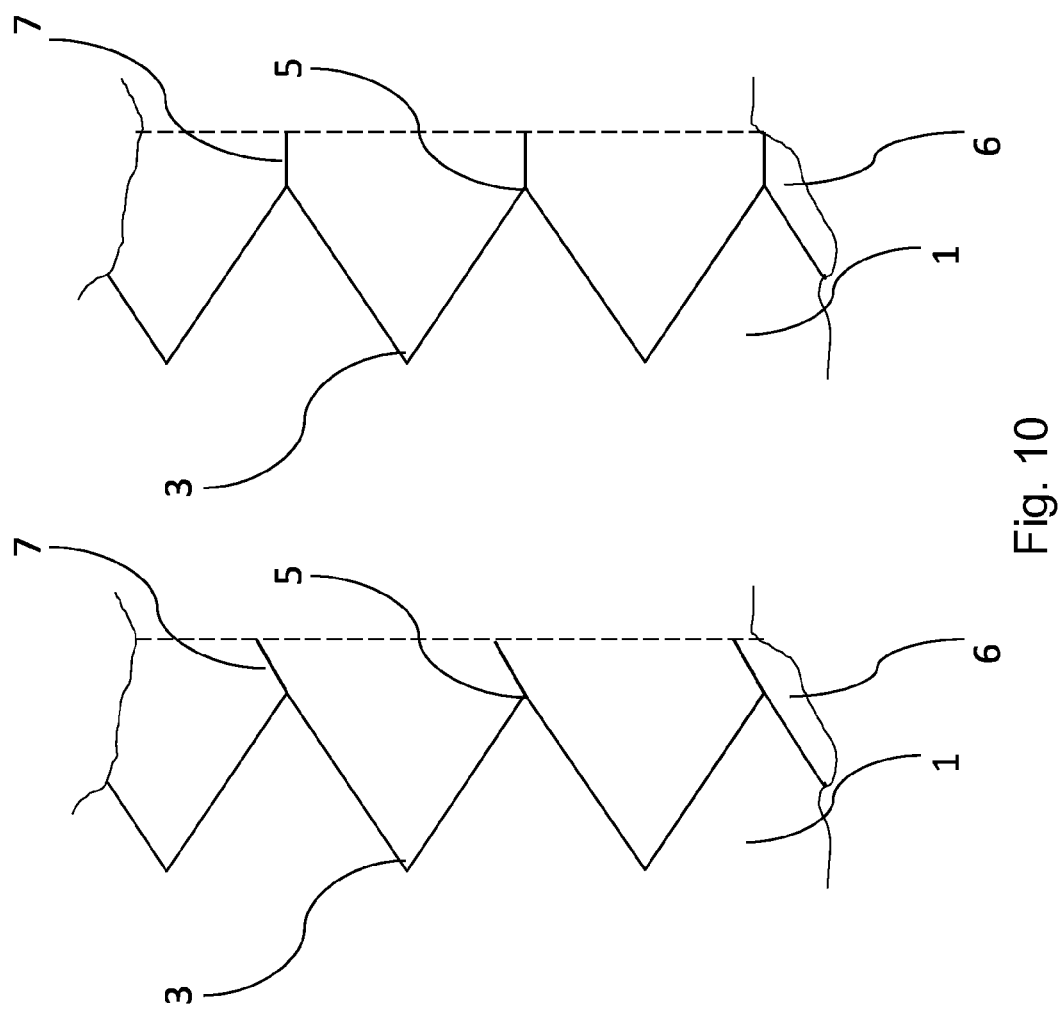

UNDERBODY PANELLING

CROSS-REFERENCE TO RELATED APPLICATIONS

The present application claims priority 35 U.S.C. §119 to European Patent Publication No. EP13175284. (filed on Jul. 5, 2012), which is hereby incorporated by reference in its entirety.

TECHNICAL FIELD

Embodiments relate to a motor vehicle component having at least one surface which, in an installed position, forms an outer side of the motor vehicle, for example, an underbody panel for covering a vehicle floor, on the downwardly directed outer side thereof, and to a motor vehicle with such a motor vehicle component.

BACKGROUND

Motor vehicle having a component such as an underbody panel for covering a vehicle floor, may be used for enhancing the aerodynamic properties of a vehicle, in particular in the region of the underbody of a motor vehicle. For this purpose, motor vehicle components, such as, for example, underbody panels, may overlap, for example, aerodynamically unfavourable add-on parts, such as, for example, an oil sump. The motor vehicle components, for their part, may be shaped in an aerodynamically favourable manner in order to contribute to as low a coefficient of drag of the vehicle as possible.

German Patent Publication No. DE 43 19 281 discloses a plate-like panel part, in particular for the underside of a vehicle floor, with at least one triangular inlet which is bounded by a semi-funnel-shaped arching of the panel part forming nozzle outlets. The inlet here is designed as a NACA inlet. Air sucked up may pass through the nozzle outlets onto the opposite side of the panel part where the air may optionally also cool vehicle units on the underside.

WO Patent Publication No. 2002/090172 discloses an underfloor panel for a motor vehicle, wherein a multiplicity of spaced-apart, dent-like, dome-shaped depressions are formed in partial regions of the underfloor panel.

German Patent Publication No. DE 10 2009 018 007 A1 discloses an underbody panel, with at least one means for fastening an air-guiding device which protrudes substantially perpendicularly from the underbody panel and extends transversely with respect to the direction of flow in the region between the front axle and the rear axle of the motor vehicle.

SUMMARY

In accordance with embodiments, an alternative motor vehicle component is provided having at least one surface which, in an installed position, forms an outer side of the motor vehicle, the motor vehicle component permitting an enhanced flow of air in the vehicle in a region of the motor vehicle component.

In accordance with embodiments, a motor vehicle component is provided having at least one surface which, in an installed position, forms an outer side of the motor vehicle, in which the surface has substantially V-shaped and/or substantially U-shaped projections/formations. The closed sides of the V-shaped and/or U-shaped projections/formations in each case face the direction of air flow provided during normal operation of the motor vehicle.

In accordance with embodiments, the motor vehicle component, which forms a part of the outer skin of the motor vehicle, has at least one region, in which V-shaped and/or U-shaped projections/formations are configured. This region, together with the projections/formations, forms a surface which has a substantially closed design. Meaning, the surface does not have any relevant number of openings or passages for conducting away the flow of air. Of course, such a closed surface may have openings separately for other purposes, such as mounting openings. The flow of air is deflected at each formation by the closed side of the substantial V- or U-shaped projections/formations, i.e., the point of the "V" or the bow or cross bar of the "U."

The closed side, installed in a vehicle, projects substantially forwards, counter to the air flowing in during normal operation, i.e., during the forwards operation of the vehicle, and therefore, the air flowing in first of all flows under the closed side of the shape, but is deflected back in the region of the open side of the shape in order to strike again against the point or the cross bar of the projections/formations substantially from the rear. The deflection of the air in the region of the open side of the V- or U-shapes may be reinforced in particular by a suitable shape, for example sloping shape, of the closed surface between the projections/formations, and/or of the projections/formations, and/or the arrangement of the projections/formations with respect to one another.

As a result of the projections/formations, a significant enhancement in the conducting of air in the region of the motor vehicle component, for example, in the region of the underbody of a vehicle in the case of an underbody panel, is achieved, in particular by expansion of the air stream and formation of a lower air pressure on the outer side of the motor vehicle component, and also by a change in the flow separation, in particular by converting a laminar flow into a turbulent flow. The design of a motor vehicle component in accordance with embodiments also makes it possible to minimize an undesirable production of noise and to stiffen the motor vehicle component.

Developments of embodiments are specified in the dependent claims, the description and the attached drawings.

The motor vehicle component is preferably an underbody panel, a wheelhouse shell, a wing, a roof or a spoiler.

The projections/formations are formed having V-shaped and/or U-shaped steps or projections. A surface which forms a plane therefore runs in each case between the closed end of the V- or U-shape and the open end thereof. The steps are formed in a sloping manner in the direction of the provided air flow such that said steps in each case have a higher step depth on the closed side thereof arranged upstream than at the open side arranged downstream. The closed sides of the motor vehicle component protrude further from the motor vehicle component than the open ends of the formations. Accordingly, the closed sides of the formations form good resistance to air flowing back counter to the primary flow of air. The closed sides of the formations project at an angle that is substantially perpendicular to the motor vehicle component, for example, to the vehicle floor.

The surface having V-shaped and/or U-shaped projections/formations may extend over at least a large part of the entire surface of the motor vehicle component, in particular over at least 50 per cent or at least 70 per cent of the motor vehicle component, and has a plurality of projections/formations.

In accordance with embodiments, the projections/formations are arranged in a plurality of lines in order to form channels. In an installed position, the channels particularly in each case project rearwardly outwards. As a result, in addition to the reduction of the air pressure on the motor vehicle component, the air stream is removed laterally to the outer side of the vehicle and therefore the air stream is reduced at rear components of the vehicle.

In accordance with embodiments, air-guiding webs may be arranged on the motor vehicle component towards the open sides of the formations in order to deflect the air steam in a controlled manner.

In accordance with embodiments, a motor vehicle may be equipped with a motor vehicle component, as described.

In accordance with embodiments, a motor vehicle component may include at least one of the following: at least one surface which, in an installed position, forms an outer side of the motor vehicle, the at least one surface having at least one projection having a V-shaped and a U-shaped cross-section with closed sides thereof projecting in a direction opposite to a direction of air flow during operation of the motor vehicle.

In accordance with embodiments, a motor vehicle may include at least one of the following: a component having at least one surface which, in an installed position, forms an outer side of the motor vehicle, the at least one surface having at least one projection having a V-shaped and U-shaped cross-section with closed sides thereof projecting in a direction opposite to a direction of air flow during operation of the motor vehicle.

In accordance with embodiments, a motor vehicle component may include at least one of the following: a surface which, in an installed position, forms an outer side of the motor vehicle, the at least one surface having a plurality of projections extending laterally on the at least one surface and which project in a direction opposite to a direction of air flow during operation of the motor vehicle.

DRAWINGS

Embodiments will be illustrated by way of example in the drawings and explained in the description below.

FIG. 4 illustrates the section A-A of FIG. 2.

FIG. 5 illustrates the section B-B of FIG. 2.

FIG. 9 illustrates three cutouts of surfaces in accordance with embodiments.

FIG. 10 illustrates two individual channels with differently positioned air-guiding webs.

DESCRIPTION

Figure 1:
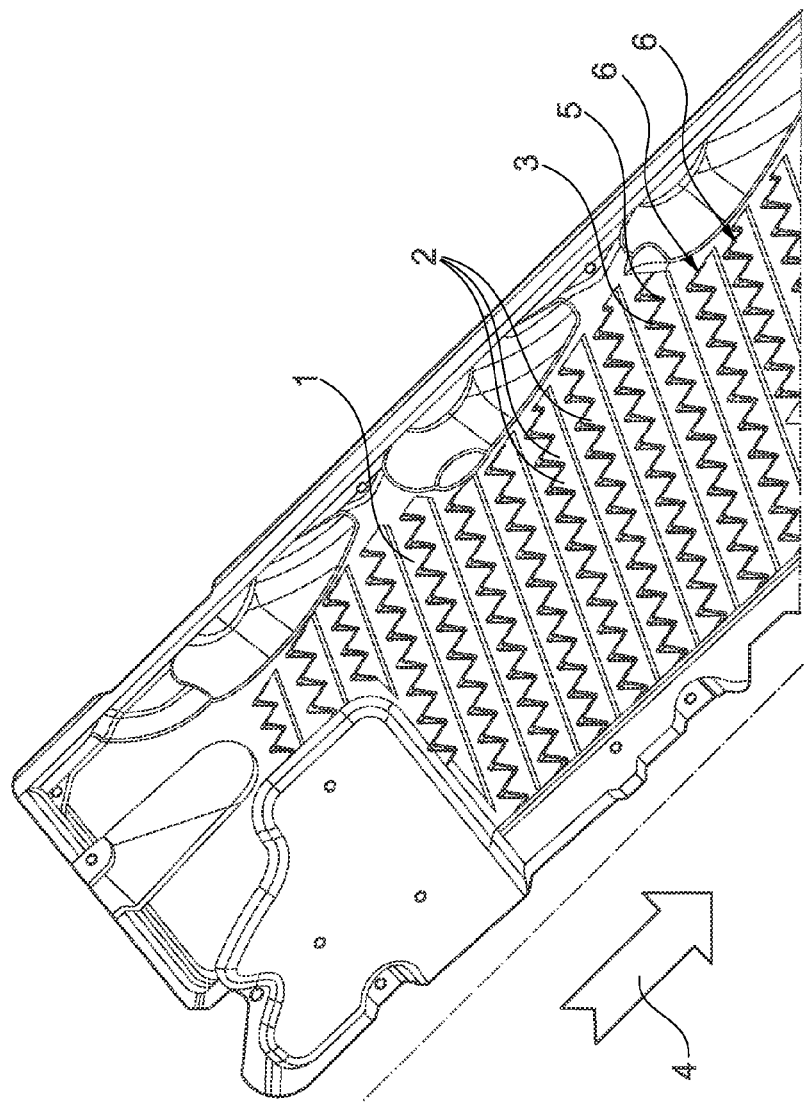
FIG. 1 illustrates a three-dimensional illustration of part of the underside of an underbody panel in accordance with embodiments.
Figure 6:
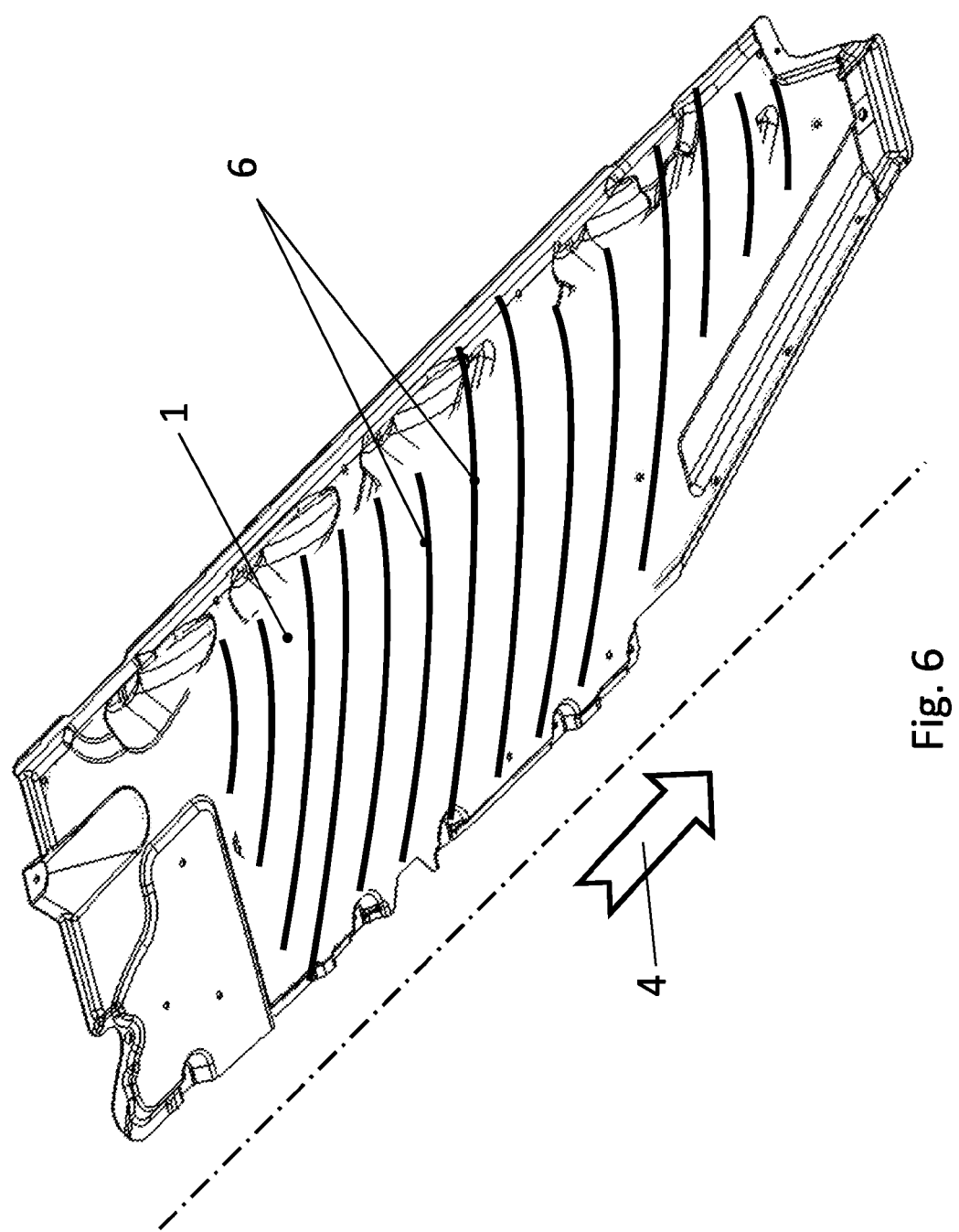
FIG. 6 illustrates part of an underside of an underbody panel in accordance with embodiments.

FIG. 1 illustrates part of a motor vehicle component in accordance with embodiments, namely an underbody panel, for covering a vehicle floor, on the downwardly directed outer side thereof, with a closed, i.e., continuous surface 1, on the downwardly directed outer side of which a multiplicity of V-shaped formations/projections 2 are formed. The projections 2 are arranged in a plurality of lines which form channels 6. In the installed position, the channels 6 in each case run, for example, rearwardly outwards and are arranged substantially parallel to one another. In the embodiment illustrated, the channels 6 are substantially rectilinear lines. In alternative embodiments, all or some of the channels 6 may also be of curved or arcuate design or cross-section such that said channels run, for example, in the shape of an arcuate circle from the front (direction of the incoming wind) rearwardly outwards, as illustrated in FIG. 6.

Figure 2:
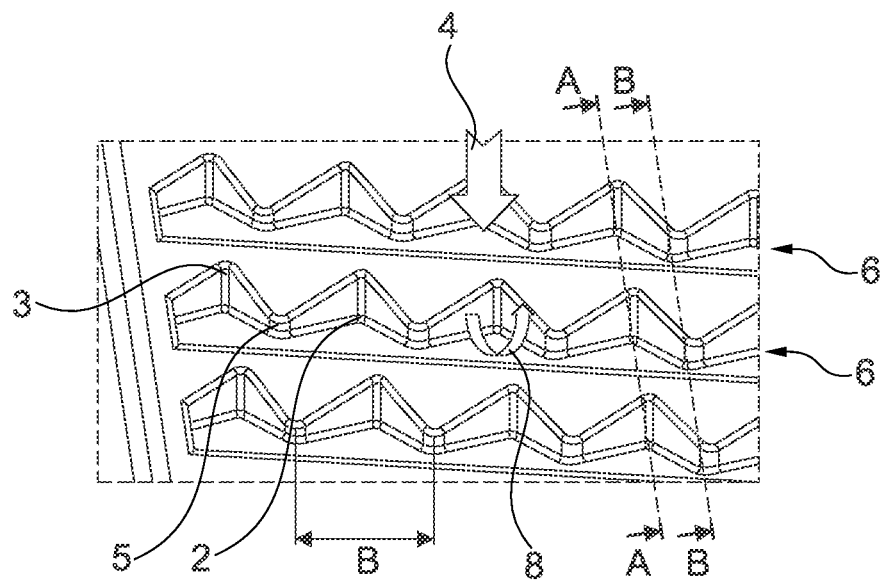
FIG. 2 illustrates part of a partial illustration of FIG. 1 from a different viewing angle.

As illustrated in FIG. 2, the V-shaped (or U-shaped) projections 2 have closed sides 3 of the V-shape, which sides face or otherwise project against the flow of air 4, the air flow 4 directed in from the front in a motor vehicle and in a direction opposite to the travel direction of the vehicle. The projections 2 form V-shaped steps, in which the steps are formed in a sloping manner in the direction of the air flow 4 in such a manner that the steps in each case have a higher step depth T on the closed side 3 thereof arranged upstream than at the open side 5 arranged downstream. Also see in this respect FIGS. 4 and 5.

The closed sides 3 of the projections 2 extend at an angle which is substantially perpendicular to the entire surface of the underbody panel.

By way of the V-shaped projections 2, an incoming stream of air 4 is deflected in such a manner that part thereof is first of all conducted in the direction of the underbody panel and, furthermore, part thereof is conducted back again, counter to the inflowing stream of air 4, in order to form a reverse flow of air 8. The air may expand in the process such that there is a lower air pressure on the underside of the underbody panel. In addition, the air is conducted outwards by the shape of the channels 6, as a result of which there is a reduction in the action of the air flow 4 on the rear wheels and components in the rear underbody region.

Figure 3:
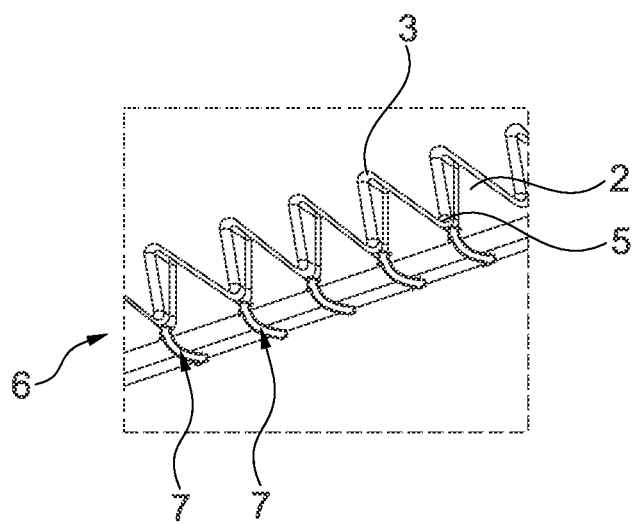
FIG. 3 illustrates part of a partial illustration of FIG. 2 from a viewing angle similar to that in FIG. 1.

As illustrated in FIGS. 3 and 5, the effect of the controlled conducting-away of the air flow 4 is enhanced by air-guiding webs 7, which are arranged on the underbody panel between regions without formation 2 and the open sides 5 of the projections 2. As a result, continuous lines of air-guiding webs 7 may be formed, the lines in each case connecting the open, flatter ends of the projections 2 of two channels 6 arranged one behind the other to one another.

The sections A-A and B-B of FIG. 2 are illustrated in FIGS. 4 and 5, in which the section A-A in each case connects the closed, deeper sides of the projections 2 of adjacent channels 6 to one another and the section B-B in each case connects the open, flatter sides of the projections 2 of adjacent channels 6 to one another.

Typical dimensions for the step depth T in FIG. 4 would be approximately 10-25 mm, and approximately 5-8 mm in FIG. 5. On the closed side of the projections 2, the step length L is preferably 30-50 mm (FIG. 4) and 12-20 mm on the open side (FIG. 5). The planar surface between the projections 2 may have a microsurface structure ("cladding"), in order to further reduce the air resistance.

Figure 7:
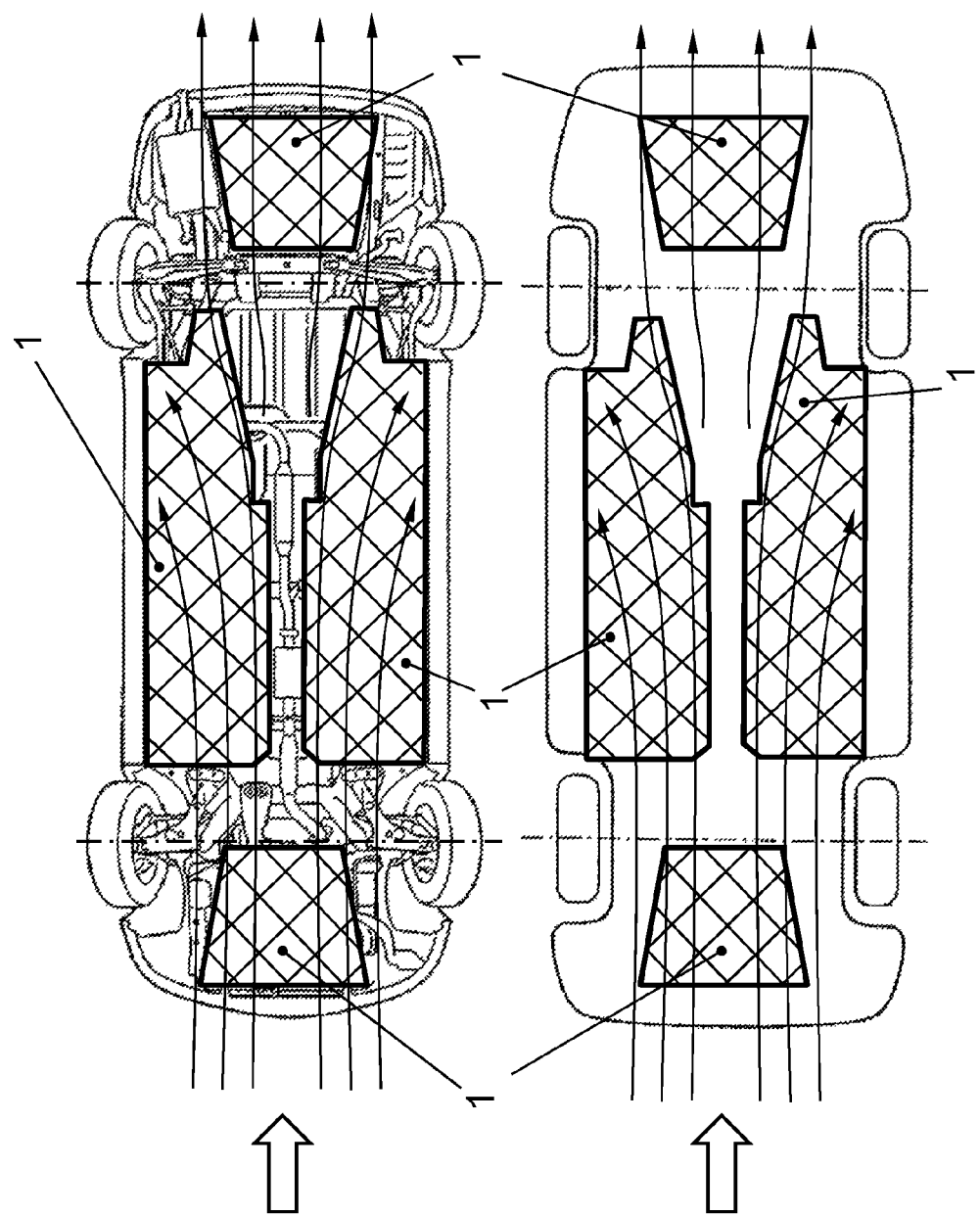
FIG. 7 illustrates an underside of a motor vehicle with an underbody panel with additional motor vehicle components (at the top) and without said additional components (at the bottom), in accordance with embodiments.

As illustrated in FIG. 7, a vehicle in accordance with embodiments may also have a plurality of closed surfaces 1 which may be arranged, for example, spaced apart from one another. The arrangement of the channels 6 on the surfaces, of which there is optionally a plurality, is possible, for example, in such a manner that the channels run rearwardly outwards from the vehicle centre. In the region at the front and rear of the motor vehicle, a different arrangement of the channels 6 may be formed on the surfaces, of which there is optionally a plurality, than on the lateral surfaces, for example, transversely with respect to the direction of travel, or else following the profile of the channels 6 arranged rearwardly outwards on the lateral surfaces, and therefore an identical guidance of the air stream 4 is produced for the entire underbody.

Figure 8:
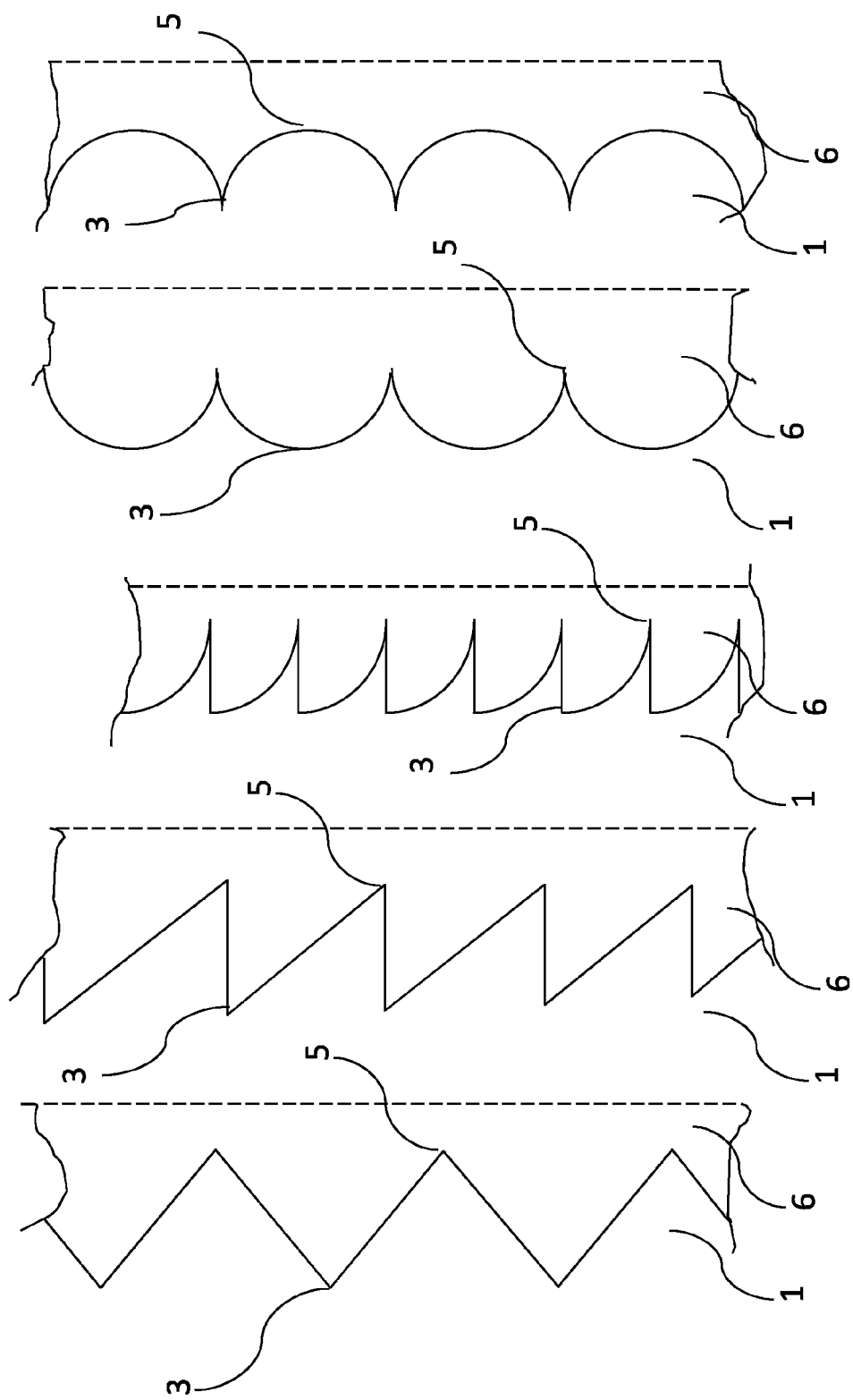
FIG. 8 illustrates five individual channels with differently shaped formations.

FIG. 8 illustrates a number of possible geometrical forms in accordance with embodiments of the substantially V- or U-shaped projections 2. The formations are in each case illustrated with the closed side 3 to the left and the open side 5 to the right. In addition to a simple V-shape right on the left in FIG. 8, these formations include a serrated shape, a serrated shape with teeth rounded on one side, semi-circular arcs, with the arcs of the circle constituting the closed side 3, or semi-circular arcs, with the tapering ends of the half circles constituting the closed side 3.

As illustrated in FIG. 9, the projections 2 of adjacent channels 6 may be arranged with respect to one another in different ways. The closed sides 3, for example points, as illustrated, may thus be arranged in the same direction one behind another (FIG. 9 centre) or else exactly opposite one behind another (FIG. 9 on the right). The formations may also be positioned offset with respect to one another (FIG. 9 on the left).

As illustrated in FIG. 10, the air-guiding webs 7 may also be positioned in a different manner to the projections 2. For example, the air-guiding webs 7 may be arranged in a sloping manner with respect to the profile of the channels 6 and, in particular, may continue the profile of the projections 2 at least on one side (FIG. 10 on the left). The air-guiding webs 7 may also be perpendicular to the profile of the channels 6 (FIG. 10 on the right). In the case of channels 6 running in a sloping manner with respect to the motor vehicle, the air-guiding webs 7, for example, may face exactly rearwards in the direction of travel.

The term "coupled" or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significamyce unless otherwise indicated.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 closed surface
2 formation/projection
3 closed side
4 air flow/stream
5 open side
6 channel
7 air-guiding web
8 reverse flow of air
T step depth
L step length
B width of the formations

What is claimed is:

1. A motor vehicle component, comprising:
at least one surface which, in an installed position, forms an outer side of the motor vehicle, the at least one surface having at least one projection each having a V-shaped cross-section or a U-shaped cross-section with an open side, and a closed side projecting in a direction opposite to a direction of air flow during operation of the motor vehicle, wherein the open side and the close side are formed on the same plane of the at least one surface,
wherein the at least one projection comprises steps formed in a sloping manner in a direction of the air flow such that the steps have a higher step depth on the closed sides thereof arranged upstream than at the open side arranged downstream.

2. The motor vehicle component of claim 1, wherein the motor vehicle component comprises one of an underbody panel, a wheelhouse shell, a wing, a roof and a spoiler.

3. The motor vehicle component of claim 1, wherein the surface does not have any regular openings.

4. The motor vehicle component of claim 1, wherein, in the installed position, the closed sides of the at least one projection protrude further from the surface than open sides of the at least one projection.

5. The motor vehicle component of claim 1, wherein the closed sides of the at least one projection project at an angle which is perpendicular to the surface.

6. The motor vehicle component of claim 1, wherein the surface extends over at least a part of the surface of the motor vehicle component.

7. The motor vehicle component of claim 1, wherein the at least one projection is arranged in a plurality of rows with adjacent rows forming a channel therebetween.

8. The motor vehicle component of claim 7, wherein, in the installed position, the channels extend rearwardly outwards.

9. The motor vehicle component of claim 1, further comprising air-guiding webs arranged on the motor vehicle component towards open sides of the at least one projection.

10. The motor vehicle component of claim 1, further comprising air-guiding webs arranged on the motor vehicle component towards open sides of the projections.

11. A motor vehicle, comprising:
a component having at least one surface which, in an installed position, forms an outer side of the motor vehicle, the at least one surface having at least one projection having a V-shaped cross-section or a U-shaped cross-section with an open side, and a closed side projecting in a direction opposite to a direction of air flow during operation of the motor vehicle, wherein the open side and the close side are formed on the same plane of the at least one surface,
wherein the at least one projection comprises steps formed in a sloping manner in a direction of the air flow such that the steps have a higher step depth on the closed sides thereof arranged upstream than at the open side arranged downstream.

12. A motor vehicle component, comprising:
a surface which, in an installed position, forms an outer side of the motor vehicle, the at least one surface having a plurality of projections extending laterally on the at least one surface, the plurality of projections with an open side, and a closed side which project in a direction opposite to a direction of air flow during operation of the motor vehicle, wherein the open side and the close side are formed on the same plane of the surface, wherein the plurality of projections comprise steps formed in a sloping manner in a direction of the air flow such that the steps have a higher step depth on the closed side thereof arranged upstream than at the open side arranged downstream.

13. The motor vehicle component of claim 12, wherein the motor vehicle component comprises one of an underbody panel, a wheelhouse shell, a wing, a roof and a spoiler.

14. The motor vehicle component of claim 12, wherein the projection has at least one of a V-shaped cross-section or a U-shaped cross-section.

15. The motor vehicle component of claim 12, wherein the closed sides of the projections project at an angle which is perpendicular to the surface.

16. The motor vehicle component of claim 12, wherein the projections are arranged in a plurality of rows with adjacent rows forming a channel therebetween.

* * * * *